United States Patent
Tognazzini

[19]

[11] Patent Number: 5,914,675
[45] Date of Patent: Jun. 22, 1999

[54] EMERGENCY LOCATOR DEVICE TRANSMITTING LOCATION DATA BY WIRELESS TELEPHONE COMMUNICATIONS

[75] Inventor: Bruce Tognazzini, Woodside, Calif.

[73] Assignee: Sun Microsystems, Inc., Palo Alto, Calif.

[21] Appl. No.: 08/652,051

[22] Filed: May 23, 1996

[51] Int. Cl.[6] ................................................. G08G 1/123
[52] U.S. Cl. ..................... 340/989; 340/426; 340/988; 342/457
[58] Field of Search .................................... 340/988, 989, 340/436, 539, 573, 426; 364/460, 449.7, 449.1, 449.9, 449.8; 342/457; 379/59; 455/422; 701/300, 207, 213

[56] References Cited

U.S. PATENT DOCUMENTS

| | | | |
|---|---|---|---|
| 4,369,426 | 1/1983 | Merkel | 340/989 |
| 5,223,844 | 6/1993 | Mahsell et al. | 342/457 |
| 5,303,286 | 4/1994 | Wiedeman | 379/59 |
| 5,311,197 | 5/1994 | Sorden et al. | 342/457 |
| 5,334,974 | 8/1994 | Simms et al. | 340/988 |
| 5,504,482 | 4/1996 | Schreder | 364/449.7 |
| 5,515,043 | 5/1996 | Berard et al. | 340/988 |
| 5,557,254 | 9/1996 | Johnson et al. | 340/426 |
| 5,572,204 | 11/1996 | Timm et al. | 340/989 |

FOREIGN PATENT DOCUMENTS

| | | |
|---|---|---|
| 0528530 | 2/1993 | European Pat. Off. . |

*Primary Examiner*—Brent A. Swarthout
*Attorney, Agent, or Firm*—McDermott, Will & Emery

[57] ABSTRACT

A portable emergency locator device includes a global positioning system (GPS) receiver generating location data and a wireless telephone transceiver for transmitting the location data as digital data to a called station during a two-way voice conversation via a wireless telephone network (cellular, PCS, or satellite). The emergency locator device can be implemented as a conventional wireless telephone having interfaces for receiving the location data from an external GPS receiver and vehicle status data from external vehicle control systems. The data received from the interfaces is stored in an internal memory for transmission to the called station in response to an emergency event trigger.

3 Claims, 5 Drawing Sheets

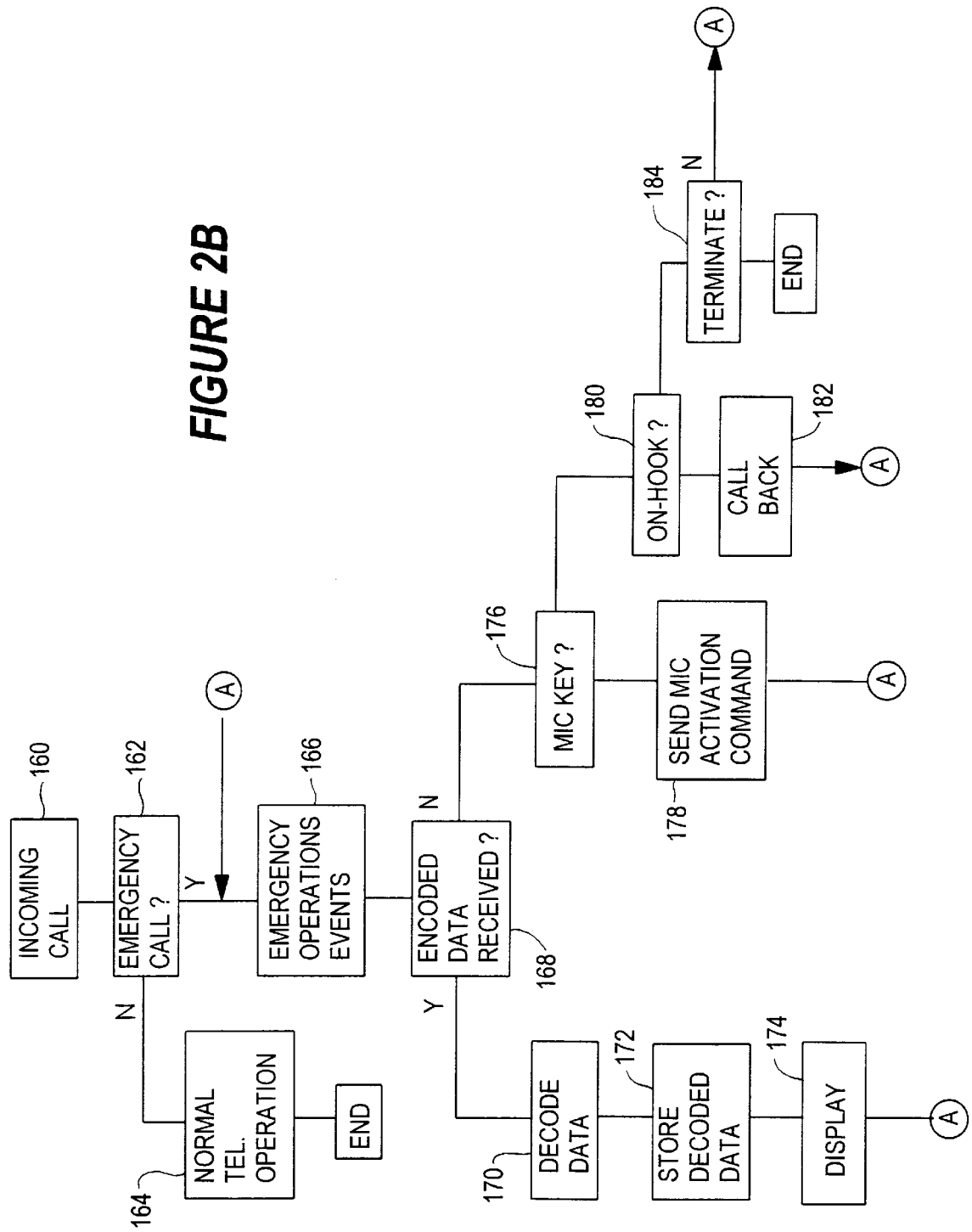

EMERGENCY LOCATOR DEVICE TRANSMITTING LOCATION DATA BY WIRELESS TELEPHONE COMMUNICATIONS

FIELD OF THE INVENTION

The present invention relates to emergency locator devices, specifically emergency locator beacons that transmit a distress signal for detection and location by rescue teams.

DESCRIPTION OF RELATED ART

Emergency locator beacons are built into aircraft or other vehicles to broadcast a distress signal during emergency conditions. The distress signal is used by rescue teams to become aware of an emergency and to locate the emergency site by performing triangulation on the detected signal. Specifically, beacon detectors are positioned at two or more locations to identify the relative direction of the emergency locator beacon. The relative directions detected by the respective detectors are correlated to identify the specific location of the emergency locator beacon transmitting the distress signal.

Conventional emergency locator beacons have the problem of requiring substantially continuous transmission of distress signals to ensure reliable detection thereof. For example, rescue teams need to detect the distress signal for a sufficient period of time to verify the emergency condition, dispatch rescue personnel, install directional receivers at two or more locations for triangulation, and then triangulate the detected distress signals to fix the approximate location of the emergency locator beacon. In addition, successive measurements by rescue teams may be necessary in order to determine more precise locations of the beacon. Hence, if an emergency locator beacon ceases to transmit because its battery runs down over an extended period of time, the search team may be unable to locate the emergency locator beacon.

In addition, such emergency locator beacons typically transmit distress signals at VHF frequencies which propagate as line of sight transmissions from the beacons. If a crash site is in a canyon, the canyon walls may limit the propagation of the distress signals. Hence, detection of the transmitted distress signal may be difficult for terrestrial-based receivers or receivers aboard low-flying aircraft (i.e., below 50,000 feet) if an emergency locator beacon from an aircraft ends up in canyon areas unless rescue aircraft are directly overhead. Similar problems may exist for sea-based emergency beacons that transmit a distress signal from beyond a horizon.

The prior art includes at least one product which combines the use of a conventional RF voice radio with a global positioning system (GPS) receiver. However, the product still suffers from the disadvantage that rescue receivers may be unable to detect the radio signal either due to limited range, interference, or obstructions preventing reception of a line of sight transmission.

SUMMARY OF THE INVENTION

In view of the foregoing, there is a need for an emergency locator device that enables a distress signal to be received from any location, regardless of geography or topography of a crash site.

There is also a need for a portable emergency locator device that is compact and portable by survivors of a crash.

There is also a need for an emergency locator device that provides updated location information for rescue teams to locate survivors moving away from a crash site.

There is also a need for an emergency locator device that provides location information indicating the current location of the emergency locator device, and information related to the condition of a vehicle that suffered a crash.

These and other needs are attained by the present invention, where according to one aspect of the present invention an emergency locator device includes a wireless receiver interface receiving digital location data indicating a current location, and a wireless telephone transceiver sending the digital location data to a called station via a wireless telephone communications system in response to an emergency trigger. Use of existing commercial wireless telephone communication system enables the emergency locator device of the present invention to be applied in a variety of applications, including highway vehicle locator devices, aircraft rescue devices, sea rescue devices, etc. Moreover, the digital location data may be provided from a commercially available wireless location data receiver that receives wireless location data from a wireless location detection system. Hence, the emergency locator device of the present invention can be implemented as a low cost device that provides accurate location data to rescuers using existing wireless telephone technology.

In another aspect of the present invention, a method includes the steps of determining a current location from wireless location data received from a wireless location detection system, initiating a first telephone call using a wireless telephone in communication with a wireless telephone communication system and accessing a called station in response to an emergency trigger, and supplying digital data identifying the determined current location to the called station during the first telephone call. Use of a wireless telephone to transmit the digital data identifying the determined current location to the called station enables existing wireless telephone systems, including cellular, PCS, and satellite telephone systems, to serve as communication carriers for emergency locator devices with minimal complexity.

Still another aspect of the present invention provides a system having a portable device and an emergency receiver. The portable device includes a wireless receiver interface receiving first digital location data indicating a current location of the portable device, and a wireless telephone transceiver initiating a telephone call via a wireless telephone communication system and sending the first digital location data in response to an emergency trigger. The emergency receiver includes a telephone interface receiving the telephone call from the portable device, and a decoder identifying the current location in response to the received digital location data. Hence, the system of the present invention enables a portable device, for example, a wireless telephone having a location detection device, to initiate a telephone call to ground-based and airborne rescue teams using the available wireless telephone communication systems. In addition, the emergency receivers enable rescue to maintain contact with survivors, while receiving updated position information of the portable devices.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein:

FIGS. 2A and 2B are flow diagrams summarizing the operations of the control processor in the portable device and the emergency receiver system of FIG. 1, respectively.

NOTATIONS AND NOMENCLATURE

Figure 1:
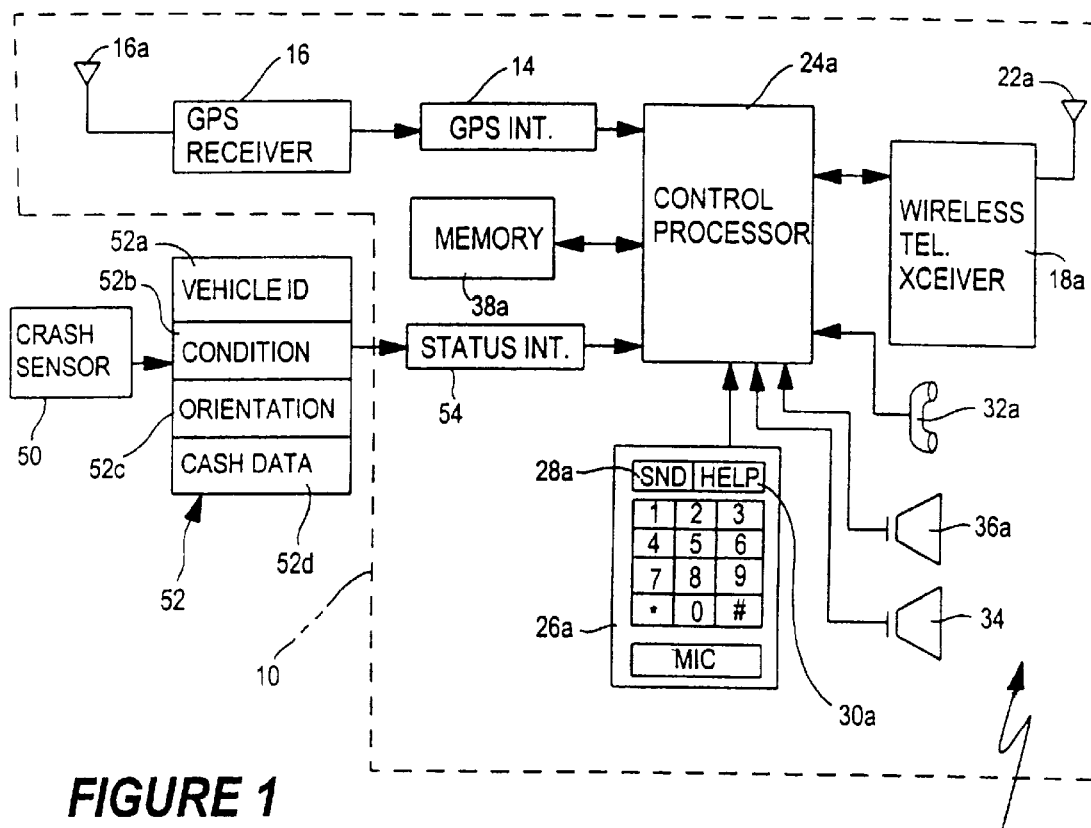
FIG. 1 is a block diagram of an emergency locator system according to an embodiment of the present invention.
Figure 1:
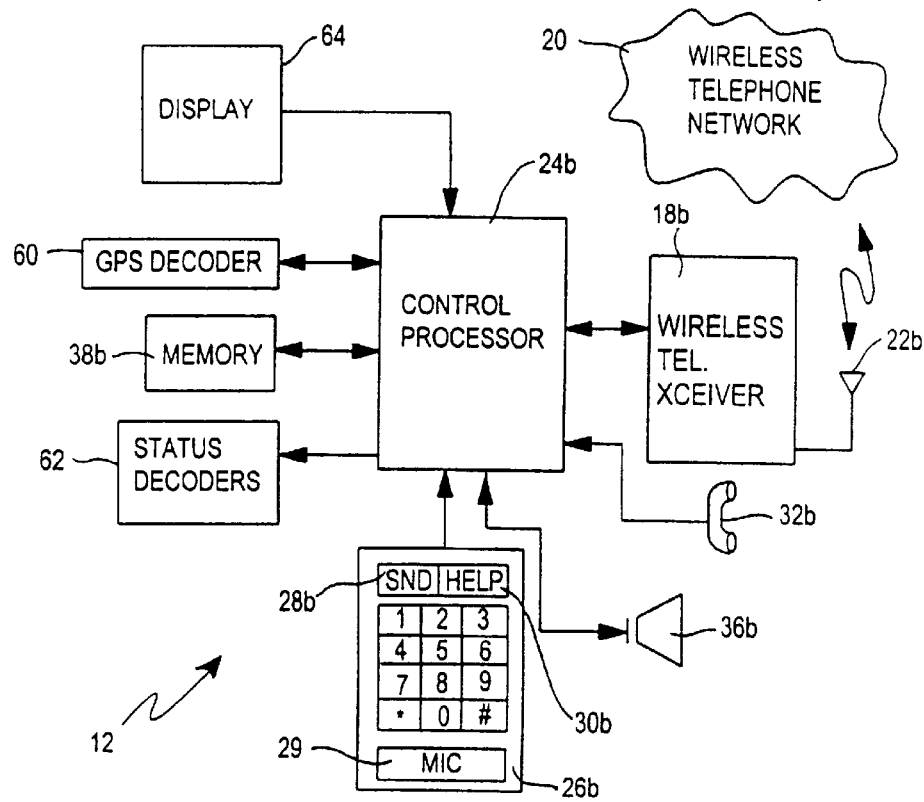

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given. location detection systems, for example, the global positioning system (GPS) network, and commercially-available wireless telephone communications systems to provide an economic emergency locator device. As described below, the emergency locator device includes a GPS receiver interface, a crash sensor or manual triggering device, and a wireless telephone transceiver in communication with a wireless telephone communication system, for example, a cellular, PCS, or satellite-based telephone communications system. The emergency locator device may be implemented as a portable unit suitable for hand-held use for survivors of a crash, or as an integrated system that receives vehicle condition data, for example, aircraft flight status data. Similarly, the system can be adapted for sea rescue by providing the emergency locator device as part of a rescue package stored aboard a life boat. The system may also be incorporated as part of a mobile telephone system in a highway or off-road motor vehicle, where available cellular telephone systems may be used instead of satellite telephone systems. Finally, the system may be implemented as a conventional wireless telephone having a distress key enabling a user to automatically notify law enforcement authorities of the user's location.

FIG. 1 is a block diagram of the emergency location system according an embodiment of the present invention. The emergency system includes an emergency locator device 10 and an emergency receiver system 12. The emergency locator device 10, preferably a portable device, includes a wireless receiver interface, such as a GPS interface 14, that receives digital location data indicating a current location of the emergency locator device 10 from a wireless location data receiver 16. The receiver 16, preferably a GPS receiver, receives wireless location data from a wireless location detection system such as the global position system (GPS), and calculates and outputs the digital location data to the GPS interface 14. Depending of the application, the GPS receiver 16 may be integrated as part of the emergency locator device, where the emergency locator device 10 operates as an integrated wireless telephone having the GPS receiver 16. Alternately, the emergency locator device may be implemented as a low cost wireless telephone having the GPS interface 14 that receives the digital location data from an external GPS receiver 16 that can be disconnected from the telephone portion.

The GPS receiver 16 is preferably implemented as a miniaturized GPS receiver integrated with the telephone portion of the emergency locator device 10. The receiver 16 measures the time a radio signal takes to travel from a GPS satellite in the GPS network (not shown) until it arrives at the antenna 16a. The GPS receiver 16 will listen to signals from either 3 or 4 satellites at a time and triangulate a position fix using the interval between the transmission and reception of the satellite signal from the GPS satellite system. The GPS receiver 16 may track up to 8 satellites at a time, such that if one satellite becomes unavailable, the GPS receiver 16 knows where to find a best possible replacement. As known in the art, three satellites are used for two dimensional positioning, although 4 satellites may be used for three dimensional positioning, i.e., position and elevation.

The GPS receiver 16 thus determines a current location of the emergency locator device 10 within an accuracy of +/−100 meters and supplies the current location information to the GPS interface 14 for storage in memory, described below. If desired, accuracy may be reduced to an error of less than 24 meters by eliminating errors introduced by selective availability, currently implemented by the U.S. Air Force, or by performing differential GPS by placing a second GPS receiver at a fixed point, for example at the emergency receiver system 12. Error reduction techniques using differential GPS are well known in the art.

The emergency locator device 10 and the emergency receiver system 12 each include a wireless telephone portion including a wireless telephone transceiver 18 that communicates with a wireless telephone network 20 via respective antennas 22. The telephone portion also includes a control processor 24, for example, a microprocessor, that controls the operations of the telephone transceiver, described below. The telephone portion further includes a keypad 26 that accepts user input digits corresponding to a telephone number of a destination station. The control processor 24 controls the transceiver 18 to initiate a wireless telephone call to the corresponding destination station in accordance with the user-input digits and in response to the user depressing the send key 28. The telephone portion also includes a handset 32, and a speakerphone 36 that converts received audio signals into digital signal samples for transmission by the transceiver 18, and converts received digital signal samples from the transceiver 18 into signals audible by a user. The speakerphone is activated in response to a user input, for example, pressing a speakerphone key (not shown). Thus, a user of the portable emergency locator device 10 would activate the speakerphone 36a by pressing an appropriate button on the keypad 26a.

Finally, the telephone portion of the emergency locator device 10 and the emergency each include a non-volatile memory 38 that stores a predetermined number corresponding to a rescue station. For example, a user may trigger the emergency locator device manually by pressing a help/ distress key 30a on the keypad 26a, causing the control processor 24a to access the predetermined number corresponding to the rescue station. Depending on the application, the predetermined number may be a centralized dispatch center, a specific rescue service, a vehicle assistance service, or local law enforcement authorities. If no predetermined emergency telephone number is stored in the memory 38, pressing the help key 30 will cause the control processor 24 to initiate a call to the default value of 911 for emergency services.

The emergency locator device 10 may also initiate the emergency telephone call in response to an emergency trigger generated by a crash sensor 50 in response to a detected crash event. For example, the crash sensor 50 may be part of a vehicle crash detection system which outputs the signal to a vehicle status monitoring system 52. The vehicle status monitoring system 52 may be part of a centralized control in a vehicle, for example, an aircraft control system, that periodically outputs vehicle status data to the emergency locator device 10. For example, the monitoring system 52 includes non-volatile memory registers 52a, 52b, 52c and 52d storing vehicle identification, vehicle condition, vehicle orientation (for example, pitch, roll, attitude), and vehicle crash data, respectively. The vehicle status data is supplied to a status interface 54 in the emergency locator device 12, which passes the received vehicle status data to the control processor 24a for storage in the memory 38a.

Hence, the control processor 24a receives environmental data including digital location data indicating the current location of the device 10, vehicle status information, etc. and stores the information in the memory 38a. If the emergency locator device 10 becomes separated from the rest of the vehicle during a crash, the control processor 24a can still provide location and vehicle status information to rescue teams by accessing the memory 38a. A rescue team using the receiver 12 is thus able to quickly obtain the status of the events at the emergency locator device. If desired, the called station 12 can issue a command during the 2-way telephone call to initiate the external microphone 34 in order to listen to surrounding events.

As shown in FIG. 1, the emergency receiver system 12 includes a GPS decoder 60 and status decoders 62 to decode the received digital data from the emergency locator device into the GPS location data and the vehicle status information, respectively. If desired, the control processor 24b outputs the decoded data onto a display 64, for example, as a digitized map identifying the current location of the emergency locator device as represented by the received digital location data. In addition, the decoded vehicle condition data may be used by rescue crews to determine the status of the emergency and the condition of the vehicle, for example, whether an aircraft landed intact, and whether the aircraft is oriented in an upright position.

According to the disclosed embodiment, the emergency locator device 10 and the emergency receiver 12 are each implemented as wireless telephone transceivers, for example, cellular or satellite telephone transceivers, where digitally-encoded data received from the data interfaces 14 and 54 can be transmitted during 2-way voice conversations. Hence, the control processor 24 is adapted to perform all telephone control functions associated with communication via the wireless telephone network, and to manage the reception of status data. For example, the control processor 24a stores the data received from the GPS interface 14 and the status interface 54 and stores the received data in memory 38a. Upon detecting an emergency trigger, the control processor 24a activates the wireless telephone transceiver 18a to initiate a 2-way telephone call to the called station 12 via the wireless telephone communication system 20. During the 2-way voice conversation, the control processor 24a transmits the status data stored in memory 38a. The control processor 24b, upon receiving the digital data during the 2-way voice conversation, outputs the digital data to the decoders 60 and 62. The decoded data is output from the decoders 60 and 62 and stored by the control processor 24b and the memory 38b.

If desired, the emergency receiver 12 may activate the microphone 34 on the emergency locator device by pressing the microphone key 29 on the keypad 26b, causing the control processor 24b to send a digital command via the wireless telephone network to the control processor 24a. Upon receiving the microphone activation command, the control processor 24a activates the external microphone 34 and transmits the received digital signal samples of received audio inputs from the microphone 34 to the called station 12.

The wireless telephone network 20 is preferably a commercially-available network, for example, a terrestrial cellular or personal communication system (PCS) telephone network. Alternatively, the wireless telephone network 20 may be a satellite-based telephone communication network, where the wireless telephone transceiver 18a is a low-power satellite transceiver that links with one of the satellites of the satellite network. As recognized in the art, one available satellite system is a low-earth-orbit phone system, such as the Iridium system. Other satellite systems will be recognized by those skilled in the art. Satellite-based telephone networks 20 have the advantage of worldwide access, regardless of location or topography of the location (for example, a canyon), since a direct line of site transmission is generally available between one of the satellites of a network and the emergency locator device 10. Hence, satellite-based emergency locator devices 10 are preferable for ships, airplanes, or users that may be in remote locations, for example, during wilderness exploration, etc. In contrast, cellular or PCS-based emergency locator devices are preferable in applications involving highway vehicles or users located in regions having established cellular and PCS telephone networks.

A particularly economic implementation is a telephone portion of the emergency locator device physical separable from the GPS receiver 16 and the vehicle status registers 52. In such a case, the user may detach the emergency locator device 10 from the vehicle status sensor 52 and the GPS receiver 16 in order to operate the portable device as a wireless telephone. Hence, the emergency locator device may be implemented as an intrinsic part of the wireless telephone, enabling a user under non-emergency conditions to place regular cellular, PCS or satellite telephone calls.

Figure 2A:
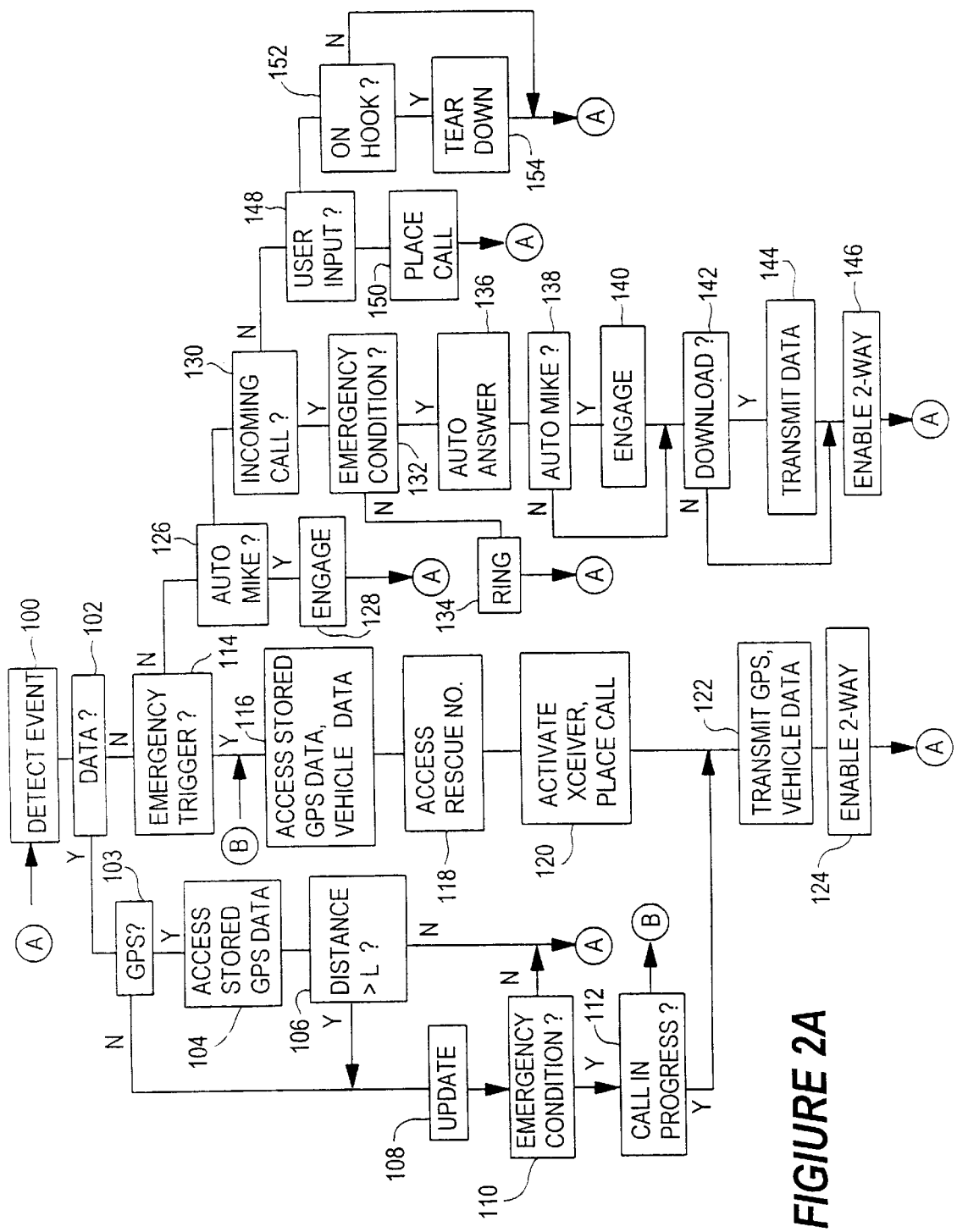

FIG. 2 is a flow diagram of the operations of the control processor 24a according to the disclosed embodiment. The method shown in FIG. 2A may be implemented as software executable by the control processor 24a, which is stored in the memory 38a or some other tangible medium. The control processor 24a begins after initialization by entering a event detection state in step 100. Control and signaling operations may also be performed periodically between the control processor 24a, the telephone transceiver 18a, and with the wireless telephone network 20, for example during roaming.

Upon detecting an event other than background telephone operations, the control processor 24a determines in step 102 whether the detected event is the reception of status data from the GPS interface 14 or the status interface 54. If the detected event is received data, the control processor 24a determines in step 103 if the received data is GPS data. If the received data is GPS data, the control processor 24a accesses the previously-stored GPS data from the memory 38a in step 104, and compares the received GPS data with the stored GPS data in step 106. If the variations between GPS data indicate that the device 10 has moved at least a predetermined distance, for example, a distance L=100 meters, the control processor 24a updates the memory 38a in step 108. The control processor 24a then checks its internal registers to determine whether an emergency condition has been set in step 110. If no emergency condition has been set, the control processor 24a returns to the event detection state 100. However, if an emergency condition is detected in step 110, the control processor 24a checks in step 112 whether a telephone call is in progress. If the telephone call is in progress, the stored GPS data is transmitted in step 122. If in step 112 a call is not in progress, the control processor initiates a telephone call, described below.

If the control processor 24a determines in step 102 that the detected event is not the reception of interface data, the control processor 24a determines in step 114 whether the detected event is an emergency trigger. For example, an emergency trigger may be generated by the crash sensor 50, or by the user pressing the help/distress key 30a on the keypad 26a. If the control processor 24a detects the emergency trigger, an internal flag is set indicating the emergency condition, and the stored GPS data and vehicle data is accessed from the memory 38a in step 116. The control processor 24a also accesses a predetermined telephone number of a rescue station to be called from the memory 38a in step 118. The telephone number may correspond to a headquarters of an organization, a personal friend, or local or federal law enforcement or regulatory agencies.

After accessing the predetermined rescue telephone number, the control processor 24a activates the telephone transceiver 18a in step 120, and initiates a telephone call with the wireless telephone network 20. After the wireless network 20 has established a communication link between the emergency device 10 and the called station 12, the control processor 24a transmits the accessed GPS data and the vehicle data from the memory 38a in step 122, and enables 2-way voice conversations between the emergency device 10 and the called station 12 on the communication link in step 124.

Once the telephone call has been established, the control processor 24a returns to the event detection state. Additional events may occur during the telephone call that require action by the control processor 24a. For example, if the control processor 24a detects in step 102 the reception of interface data, and the control processor 24a determines in step 103 that the received data is vehicle data from the status interface 54, the memory 38a is updated in step 108, and the updated data is transmitted during the emergency call in step 122. Similarly, if the control processor 24a detects reception of a microphone activation command from the emergency receiver system 12 in step 126, the control processor 24a engages the external microphone 34 in step 128.

The telephone call continues until the control processor 24a detects an on-hook indication from either the wireless telephone network 20 or the user keypad 26a in step 152, at which point the wireless telephone transceiver 18a goes through conventional tear-down procedures in step 154.

The control processor 24a also detects events related to normal telephone operations. For example, if the emergency locator device 10 is idle in step 100 and the control processor 24a determines in step 130 that a detected event is an incoming call, the control processor 24a checks in step 132 whether the internal registers are set indicating an emergency condition in step 132. If the internal registers are not set, the control processor 24a performs a convention ringing function in step 134, indicating to the user an incoming call. If the user answers the call, then standard wireless telephone procedures are performed.

If the control processor 24a detects the emergency condition in step 132, the control processor 24a automatically answers the call in step 136, enabling rescuers to access the telephone regardless of whether a user is able to answer the telephone. After answering the telephone call, the control processor 24a determines whether a microphone activation command (e.g., "auto-mike") has been received in step 138. If the microphone activation command has been received, the control processor 24a engages the microphone 34 in step 140. If a download command has been received in step 142, the control processor 24a accesses the stored GPS data and vehicle status data from the memory 38a and transmits the data in step 144. Finally, the control processor 24a enables 2-way conversations in step 146. Thus, the rescuers using the receiver system 12 receive updated information from the portable emergency locator device before beginning conversations with users of the emergency locator device.

As described above, the portable device 10 may also be used as a convention wireless telephone during normal operations. Hence, if the control processor 24a determines that a detected event is a user input in step 148, for example, user input of dialed digits for a conventional call to station, the control processor 24a initiates the wireless telephone transceiver 18a to place the phone call in step 150 according to the protocol of the wireless telephone network 20. Finally, if the detected event is an onhook indication in step 152, the control processor 24a performs standard tear-down procedures in step 254.

Figure 3A:
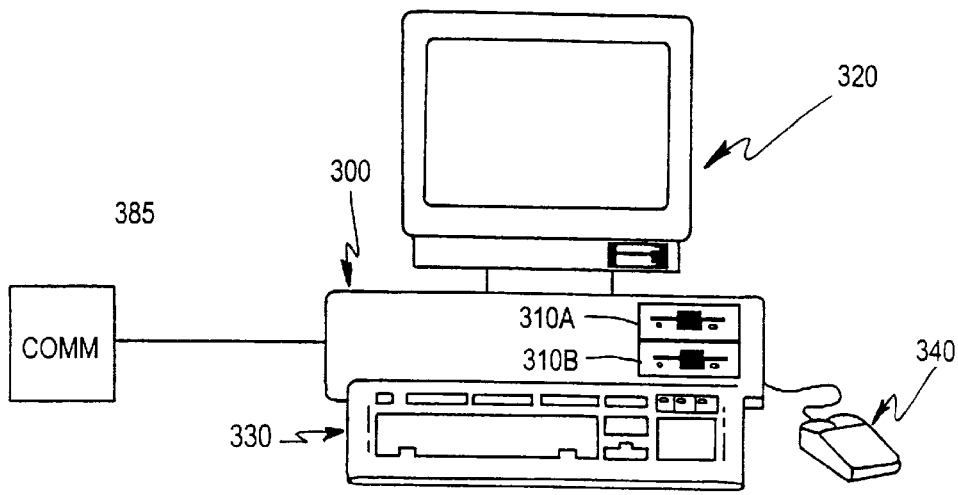
FIGS. 3A, 3B and 3C summarize an alternative embodiment of an emergency receiver system receiving wireless telephone calls from the emergency locator device of FIG. 1.
Figure 3B:
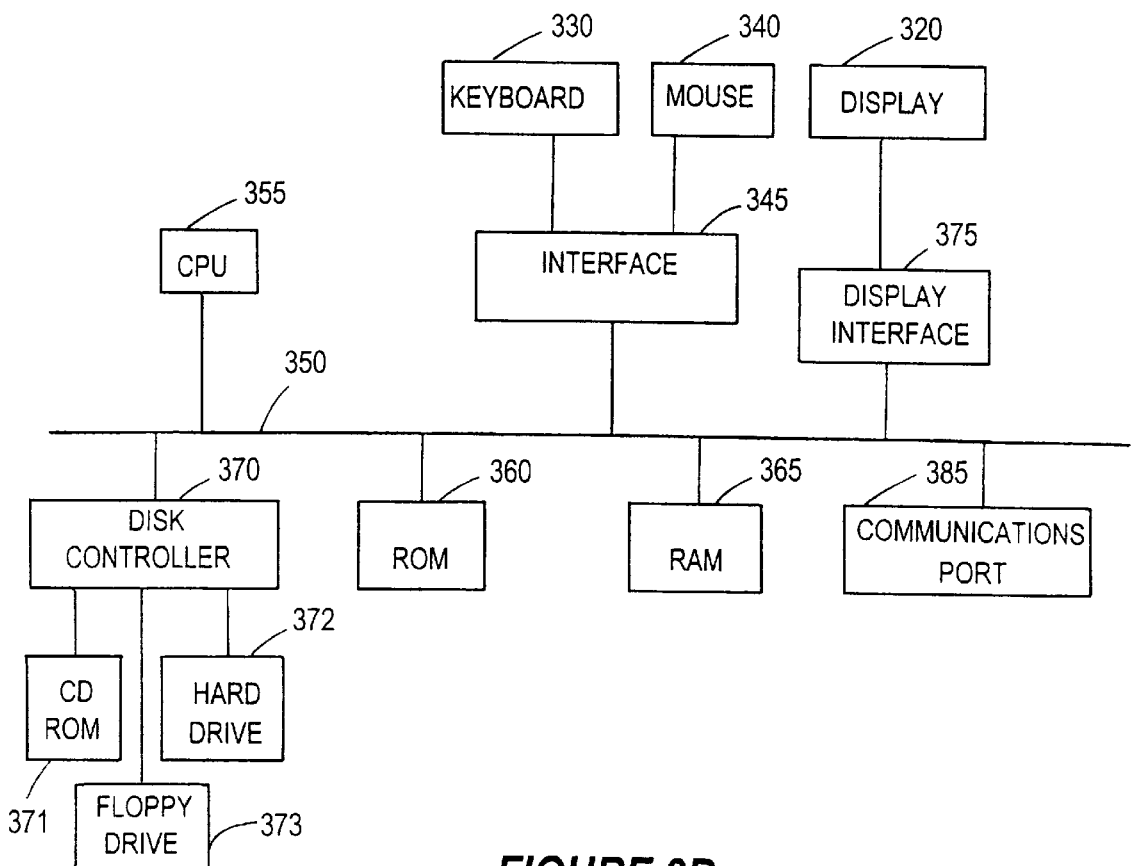

FIG. 2B is a flow diagram illustrating the operations of the control processor 24b in the emergency receiver system. The receiver system 12 may be implemented as a portable handheld telephone device having an LCD display 64 for use by rescue personnel. Alternately, the receiver system 12 may be implemented as a computer based system at a headquarters or a rescue operations center, such as shown in FIGS. 3A and 3B. Although characterized as a receiver system, the receiver system 12 includes a wireless telephone transceiver 18b to send and receive telephone calls. In addition, the wireless telephone transceiver 18b may be replaced with conventional land line access for centralized rescue operations. Hence, a plurality of rescue systems 12 may be used to enable a plurality of rescuers to place calls between each other in order to coordinate rescue efforts.

As recognized in the art, the system 12 may use advanced calling operations of the telephone network 12, for example, conferencing capabilities to enable simultaneous conversations between the rescuers and the users of the emergency locator device 10.

As shown in FIG. 2B, the control processor 24b begins by detecting an incoming call in step 160. The control processor 24b determines in step 162 if the incoming call is an emergency call, typically by a digitally-encoded message included in the telephone call, or by telephone screening by an operator monitoring incoming calls. If the incoming call is not an emergency call, then normal telephone operations are performed in step 164. However, if the incoming call is an emergency call, then emergency operations procedures are initiated in step 166, including activation of the decoders 60 and 62, and display of relevant information on the display 64. As recognized in the art, the control processor 24b may also access digital map databases to provide a geographical and/or topographical display of a region of a crash site on the display 64 based upon the received GPS data.

The control processor 24b then checks in step 168 whether encoded data such as GPS data or vehicle status data has been received in step 168. If encoded data has been received, the control processor 24b supplies the encoded data to the respective decoders 60 and 62 for decoding of the data in step 170. The decoded data is then stored in the memory 38b in step 172 and displayed on the display 64 in step 174. The control processor 24b then returns to the emergency operations event detection stage in step 166.

If the detected event is not the receipt of encoded data in step 168, the control processor 24b checks in step 176 whether rescue personnel have pressed the microphone key 29 on the keypad 26b. If the microphone key 29 has been pressed, the control processor 24b sends a microphone activation command in step 178 to the emergency locator device 10. If the emergency event detected by the control processor 24b is an onhook indication from the wireless telephone network 20 in step 180, the control processor 24b activates the wireless telephone transceiver 18b to initiate a call back procedure in step 182. Such a call back procedure is desirable, for example, if a user of the emergency locator device 10 becomes incapacitated or inadvertently hangs up the wireless telephone transceiver 18a.

Finally, if the control processor 24b detects in step 184 a command from rescue personnel to terminate the emergency status, the control processor 24b terminates the emergency operations and returns to normal status.

Figure 3C:
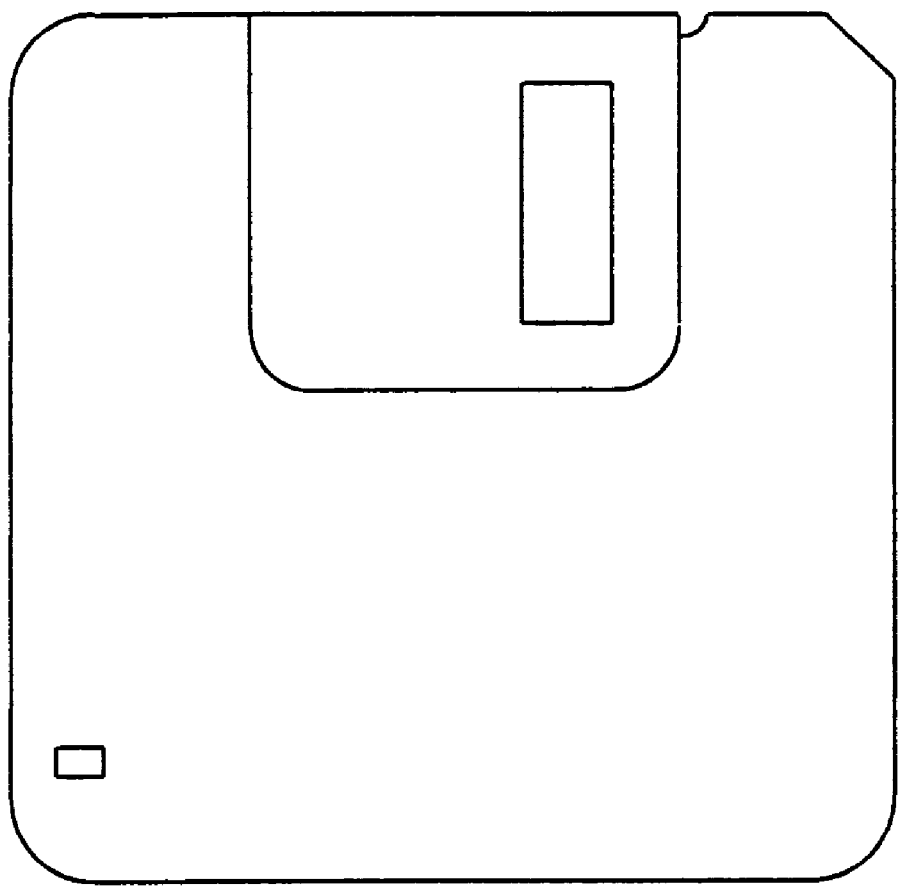

FIGS. 3A, 3B and 3C disclose one arrangement for the control processor 24b of FIG. 1. As recognized in the art, the control processor may be implemented as a computer 300 that accepts a tangible medium storing executable code that performs the above-described functions, such as a diskette as shown in FIG. 3C. The tangible medium is inserted into a disk drive 310A or 310B and loaded into the computer 300 in response to user inputs via the keyboard 330 or the mouse 340. Output from execution of the software is displayed on the display screen 320. As recognized in the art, the computer 300 may also be used to download executable software to the control processor 24a via a communications port 385. Hence, the tangible medium in FIG. 3C may store software that includes executable code for performing the functions of FIG. 2A and FIG. 2B. Alternatively, the control processor 24a may store the executable code corresponding to wireless telephone operations and the emergency locator device functions of 2A in a read only memory, such as a plug-in EPROM.

FIG. 3B is a block diagram illustrating the hardware structure of the computer 300. The computer 300 includes a central processing unit 355 that executes the software stored on the tangible medium. The tangible medium may be inserted into a floppy drive 373, or a CD ROM drive 371 under the control of a disk controller 370. In addition, the software may be stored on the tangible medium of a hard disk, under the control of a hard drive 372. Hence, the software may be stored on the tangible medium of a CD ROM, a floppy drive, or a hard drive which is read by the CD ROM drive 371, the floppy drive 373, and the hard drive 372, respectively. The software stored on the tangible medium is accessed by the disk controller 370 and temporarily stored in the random access memory 365 for execution.

The computer 300 also includes a read only memory (ROM) 360 that controls the low-level operations of the computer 300, for example BIOS operations. The CPU 355 responds to user inputs from the keyboard 330 or the mouse 340 via a user interface 345, which sends control signals to the CPU representing the user inputs. Execution of the software is also displayed on the display 320 which is driven by the display interface 375. Communications between the computer 300 and the wireless telephone network occurs via the communications port 385, which may be coupled either to a wireless telephone transceiver, such as a cellular or satellite phone, or may be coupled by land line to a public switched telephone network.

Although not shown in FIG. 3B, the computer 300 may also include a speakerphone 36b or a handset 32b that interfaces with a computer 300 to establish the 2-way voice conversations.

According to the present invention, an emergency locator device is implemented as a wireless telephone having interfaces for receiving digital location data from a GPS receiver and a vehicle status data from a vehicle status management system. Under normal operations, the emergency locator device operates as a convention wireless telephone, and stores any received location data or vehicle data in an internal memory. Upon the detection of an emergency trigger, the emergency locator device automatically places a wireless telephone call to a predetermined emergency number, and supplies the stored location data and vehicle condition data. Hence, the present invention provides an economic and portable emergency locator device having sufficient flexibility to meet a variety of applications.

Although the disclosed embodiment discloses the use of a GPS receiver, it will be appreciated that other wireless location detection systems may be used. Moreover, the complementary rescue system 12 may be implemented either as portable devices or ground-based devices, as needed. In addition, the emergency locator device may be implemented as a modular system complementary to a vehicle control, navigation and communication systems, as desired.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A method comprising:

determining a current location from wireless location data received from a wireless location detection system;

initiating a first telephone call using a wireless telephone in communication with a wireless telephone communication system and accessing a called station in response to an emergency trigger; and supplying data identifying the determined current location to the called station during the first telephone call further comprising:

terminating the first telephone call;

determining a second location from second wireless location data received from the wireless location detection system;

initiating a second telephone call using the wireless telephone to the called station if the second location is at least a predetermined distance from the location corresponding to the data supplied during the first telephone call; and supplying second data identifying the second location during the second telephone call.

2. A system comprising:

a portable device comprising:

(1) a wireless receiver interface receiving first digital location data indicating a current location of the device, and (2) a wireless telephone transceiver initiating a telephone call via a wireless telephone communication system and sending the first digital location data in response to an emergency trigger; and an emergency receiver comprising:

(1) a telephone interface receiving the telephone call from the portable device, and (2) a decoder identifying the current location in response to the received digital location data, wherein the portable device further comprises:

a memory storing the first digital location data; and a processor initiating a second telephone call by the wireless telephone transceiver in response to second digital location data received by the wireless receiver interface and indicating a second location at least a predetermined distance from the location corresponding to the stored first digital location data.

3. A computer program product for implementing an emergency locator device, comprising:

a computer readable memory medium; and a computer program including instructions for determining a current location, initiating a first telephone call and accessing a called station in response to detection of a collision; supplying data identifying the determined current location to the called station during the first telephone call in which said program further comprises instructions for terminating the first telephone call; determining a second location; initiating a second telephone call to the called station if the second location is at least a predetermined distance from the location corresponding to the data supplied during the first telephone call; and supplying second data identifying the second location during the second telephone call.

* * * * *